US007213659B2

(12) United States Patent
Saito et al.

(10) Patent No.: US 7,213,659 B2
(45) Date of Patent: May 8, 2007

(54) IMPACT DRILL

(75) Inventors: Takuma Saito, Ibaraki (JP); Shinki Ohtsu, Ibaraki (JP); Hideki Watanabe, Ibaraki (JP); Junichi Toukairin, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 58 days.

(21) Appl. No.: 11/070,164

(22) Filed: Mar. 3, 2005

(65) Prior Publication Data

US 2005/0194165 A1 Sep. 8, 2005

(30) Foreign Application Priority Data

Mar. 5, 2004 (JP) ........................... P2004-061806

(51) Int. Cl.
*B23B 46/16* (2006.01)

(52) U.S. Cl. ....................... 173/109; 173/48; 173/93.5; 173/178; 173/205; 173/211

(58) Field of Classification Search ................ 173/210, 173/211, 178, 93, 93.5, 205, 104, 109, 128, 173/48

See application file for complete search history.

(56) References Cited

U.S. PATENT DOCUMENTS 4,567,950 A 2/1986 Fushiya et al.
5,601,149 A * 2/1997 Kawasaki et al. ......... 173/93.5
5,711,379 A * 1/1998 Amano et al. ................ 173/48
5,924,928 A * 7/1999 Stegman et al. .............. 464/73
6,131,477 A * 10/2000 Gaydek et al. ............... 74/411
6,158,526 A * 12/2000 Ghode et al. ................. 173/93
6,213,222 B1 * 4/2001 Banach .......................... 173/1
6,457,535 B1 * 10/2002 Tanaka ........................ 173/48
6,550,546 B2 * 4/2003 Thurler et al. ................ 173/48
6,688,406 B1 * 2/2004 Wu et al. ...................... 173/48
7,025,151 B2 * 4/2006 Hehli et al. ................. 173/176
7,048,075 B2 * 5/2006 Saito et al. ................ 173/93.5

FOREIGN PATENT DOCUMENTS

JP 2-30169 8/1990

* cited by examiner

*Primary Examiner*—Scott A. Smith
(74) *Attorney, Agent, or Firm*—McGinn IP Law Group, PLLC

(57) ABSTRACT

An impact drill includes a first ratchet together with a spindle and movable in an axial direction, and a second ratchet engageable with the first ratchet. The second ratchet can be moved in the axial direction, and rotated with a predetermined range in a rotational direction.

11 Claims, 8 Drawing Sheets

IMPACT DRILL

BACKGROUND OF THE INVENTION

1. Filed of the Invention

The present invention relates to an impact drill for use in a drilling operation on the concrete, mortar or tile, for example, and more particularly to an impact drill having a drill mode for performing a drilling operation by rotating a drill bit and an impact drill mode for performing a drilling operation by rotating and vibrating the drill bit.

2. Description of the Related Art

FIG. 1 shows a conventional example of the impact drill of this kind. In FIG. 1, reference numeral 1 denotes a main frame portion that forms an outer shell of the impact drill and has the self-contained parts at predetermined positions, including a gear cover 17, an inner cover 18, an outer cover 19, a housing 7 and a handle portion 6. Reference numeral 2 denotes a spindle inserted transversely through the gear cover 17, and 3 denotes a drill chuck attached at the top end of the spindle. A rotational ratchet 4 is mounted near the central part of the spindle 2. The rotational ratchet 4 is rotated along with the rotation of the spindle 2, and moved along with the axial movement of the spindle 2. The serrated irregularities are formed on one face 4*a* of the rotational ratchet 4.

Reference numeral 5 denotes a stationary ratchet disposed at a position opposed to the rotational ratchet 4, in which the serrated irregularities are formed on one face 5*a* of the stationary ratchet. The stationary ratchet 5 has a hollow cylindrical shape, and is fixed to the inner cover 18, irrespective of the rotation and axial movement of the spindle 2.

On the other hand, a motor 8 is disposed inside the housing 7 linked to the handle portion 6. A rotational driving force of the motor 8 is transmitted via a gear 10 fixed to a rotation shaft 9 to a second pinion 11. The second pinion 11 has two pinion portions 11*a*, 11*b* having a different number of teeth, which are engaged with a low speed gear 12 and a high speed gear 13, respectively. When the second pinion 11 is rotated, both the gears 12, 13 are also rotated.

Reference numeral 14 denotes a clutch disk engaged with the spindle 2 and mounted to be slidable in the axial direction. If the clutch disk 14 is inserted into a concave portion of the low speed gear 12, the rotation of the second pinion 11 is transmitted via the low speed gear 12 and the clutch disk 14 to the spindle 2, as shown in FIG. 1. On the other hand, if the clutch disk 14 is slid to the right from the position of FIG. 1, and inserted into a concave portion of the high speed gear 13, the rotation of the second pinion 11 is transmitted via the high speed gear 13 and the clutch disk 14 to the spindle 2. Accordingly, the spindle 2 can be rotated at low speed or high speed by movement of the clutch disk 14.

Reference numeral 15 denotes a change lever for changing the operation mode of the impact drill, namely, between a drill mode and an impact drill mode. A change shaft 16 is press fit into the change lever 15, whereby when the change lever 15 is rotated, the change shaft 16 is also rotated. The change shaft 16 has a notch portion 16*a*, as shown in FIGS. 2, 3 and 4, whereby when the notch portion 16*a* is at the position of FIG. 2, the impact drill is operated in the drill mode, while when the notch portion 16*a*is at the position of FIG. 3, the impact drill is operated in the impact drill mode.

(A) Drill Mode

When a drill bit (not shown) attached in the drill chuck 3 is contacted with a machined surface and the handle portion 6 is pressed in a direction of the arrow in FIG. 1, an end part of the spindle 2 makes contact with the change shaft 16 to be immovable to the right, when the notch portion 16*a* of the change shaft 16 is at the position of FIG. 2. Accordingly, there is no contact between the irregular face 4*a* of the rotational ratchet 4 and the irregular face 5*a* of the stationary ratchet 5. Accordingly, a rotational driving force of the motor 8 is transmitted via the low speed gear 12 or high speed gear 13 to the spindle, so that the drill bit is given a rotational force.

(B) Impact Drill Mode

In an impact drill mode, the notch portion 16*a* of the change shaft 16 is brought into the position of FIG. 3 by rotating the change lever 15. Then, the drill bit attached in the drill chuck 3 is contacted with a machined surface. If the handle portion 6 is pushed in a direction of the arrow in FIG. 1, an end part of the spindle 2 enters the notch portion 16*a*, as shown in FIG. 4. That is, the spindle 2 is slightly moved to the right, so that the, irregular face 4*a* of the rotational ratchet 4 is contacted with the irregular face of the stationary ratchet 5.

In drilling the machined surface, if the spindle 2 is rotated in the state of FIG. 4, the rotational ratchet 4 is meshed and engaged with the stationary ratchet 5, and rotated to cause vibration due to the irregular faces of both the ratchets 4 and 5. This vibration is transmitted through the spindle 2 to the drill bit (not shown). That is, the drill bit is given a rotational force and vibration to perform a drilling operation.

However, when the impact drill described above is operated in the impact drill mode, the vibration caused by rotation of the spindle in the state where the irregular faces of the ratchets 4 and 5 are contacted under pressure is transmitted not only to the drill bit, but also through the stationary ratchet 5 and the inner cover 18 from the housing 7 to the handle portion 6. Therefore, there is a problem that the user of the impact drill undergoes a great vibration, and feels uncomfortable. Especially when the impact drill is continuously employed for a long time, care must be taken not to transmit the vibration to the user and cause adverse effect on the health of the user.

Several proposals for reducing the vibration transmitted to the user have been made. For example, in JP-B-2-30169, a structure was disclosed in which a clutch cam 22 is supported movably in the axial direction of the spindle 20, and biased and urged to a rotary cam 21 by a spring 23, as shown in FIG. 5.

In FIG. 5, reference numeral 21 denotes a rotary cam that is rotated along with the spindle 20. A cam face 21*a* of the rotary cam 21 is formed with serrated irregularities. On the other hand, the clutch cam 22 is composed of a hollow cylindrical portion slidable in the axial direction of the spindle 20 and a flange portion 22*b*. A cam face 22*c* of the flange portion 22*b* is formed with serrated irregularities.

The spring 23 is provided between the flange 22*b* of the clutch cam 22 and a plate 24*a* engaging a groove 22*a* of the clutch cam 22, and always urges the clutch cam 22 toward the rotary cam 21. Thus, when the spindle 20 is moved backward, the cam faces 21*a* and 22*c* are contacted under pressure. If a pressing force applied to the spindle 20 overcomes a resilience of the spring 23, the spring 23 is compressed, so that the clutch cam 22 is moved backward (to the right in the figure).

When the clutch cam 22 is moved forward from the back position due to a resilient force of the spring 23, it collides with the rotary cam 21, so that the rotary cam 21 is vibrated together with the spindle 20. With this structure, since the vibration caused by contact between the cam faces 21*a* and 22*c* is relieved by the spring 23 and transmitted to the handle portion (not shown), there is the effect that the vibration transmitted to the user is reduced as compared with the structure in which the ratchet 5 is firmly disposed as shown in FIG. 1.

In a case of the drill as disclosed in JP-B-2-30169, since the clutch cam 22 permits the spindle 20 to slide in the axial direction, and regulates the rotation, the slide faces 22*e*, 22*e* are vertically formed on both sides of the flange portion 22*b*, and the clutch cam 22 is carried between both the guide faces 26 of a retainer 24 extending from the plate 24*a*, as shown in FIG. 6.

When this structure has additionally a function of rotating the spindle 20 at high speed and low speed in the same manner as in FIG. 1, it has been found that there occurs a phenomenon that the impact force of the clutch cam 22 in colliding with the rotary cam 21 due to a restoring force of the spring 23 from the back position is weakened, as will be described later.

SUMMARY OF THE INVENTION

It is an object of the invention to solve the above-mentioned problems associated with the prior art, and to provide an impact drill can reduce the vibration transmitted to the user without losing a drilling ability at high and low speed rotation.

According one aspect of the invention, there is provided with an impact drill including: a spindle rotated by a motor and movable in an axial direction; a drill chuck fixed to the spindle and mountable with a drill bit; a first ratchet fixed to the spindle and having a face including an irregular portion; a second ratchet having a face including an irregular portion opposed to the face of the irregular portion of the first ratchet and movable in the axial direction, and a spring for urging the second ratchet in a direction of the first ratchet, in which the spindle is given an axial vibration by a contact and separation action between the irregular faces of the first and second ratchets due to a relative rotation of the first ratchet to the second ratchet, wherein the second ratchet is supported to be rotatable within a predetermined range in a rotational direction thereof.

According to another aspect of the invention, the second ratchet is supported to be rotatable by an angle or more from a first position at which the irregular face of the second ratchet overrides the irregular face of the first ratchet to a second position at which the irregular face of the second ratchet engages the irregular face of the first ratchet, when the first ratchet is in a stopped state.

According to another aspect of the invention, the second ratchet is supported to be rotatable by 0.6 times an angle or more from a first position at which the irregular face of the second ratchet overrides the irregular face of the first ratchet to a second position at which the irregular face of the second ratchet engages the irregular face of the first ratchet, when the first ratchet is in a stopped state.

According to another aspect of the invention, the second ratchet is supported to be rotatable by 0.3 times an angle or more from a first position at which the irregular face of the second ratchet overrides the irregular face of the first ratchet to a second position at which the irregular face of the second ratchet engages the irregular face of the first ratchet most deeply, when the first ratchet is in a stopped state.

According to another aspect of the invention, a notch portion is provided on an outer circumference of the second ratchet. A projection portion provided in a main frame portion of the impact drill is inserted into the notch portion. A predetermined clearance is provided between the notch portion and the projection portion.

According to another aspect of the invention, a width across flat of two parallel faces is provided in a part on a cylindrical portion of the second ratchet. A notch portion opposed to the width across flat is provided on a main frame portion of the impact drill. A predetermined clearance is provided between the width across flat and the notch portion.

According to another aspect of the invention, a projection portion is provided on an outer circumference of the second ratchet. The projection portion is inserted into a notch portion provided in a main frame portion of the impact drill. A predetermined clearance is provided between the projection portion and the notch portion.

According to another aspect of the invention, an elastic body is disposed in the predetermined clearance. A thrust bearing is provided between the second ratchet and the spring, or/and between the spring and a side wall portion extending from the main frame portion.

It is possible to produce a sufficient impact force between the second ratchet and the first ratchet at high and low speed rotation, whereby an impact drill having excellent drilling ability and unlikely to transmit vibration to the main body is provided. Accordingly, the user of the impact drill does not feel uncomfortable, and injure one's health.

DESCRIPTION OF THE PREFERRED EMBODIMENTS

Before explaining the embodiments of the invention, there will be described a phenomenon in which when the clutch cam collides with the rotary cam, its impact force is weakened.

Figure 1:
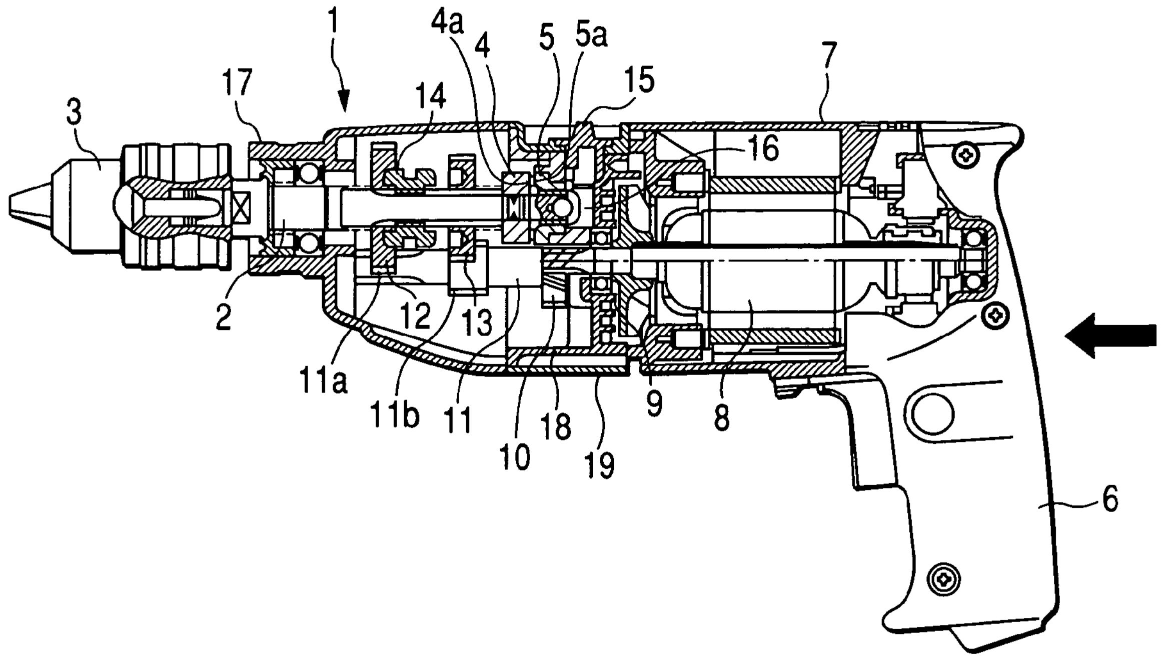
FIG. 1 is a cross-sectional view showing one example of the conventional impact drill.
Figure 2:
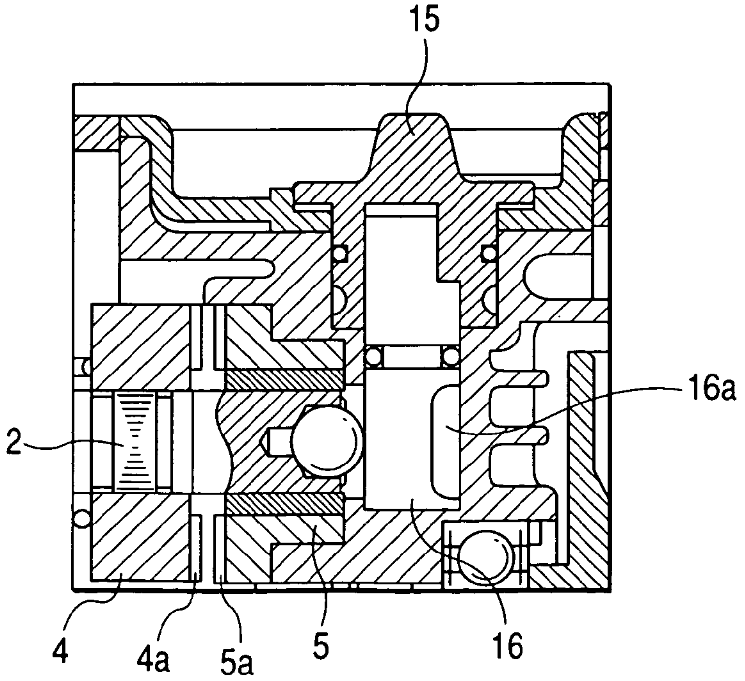
FIG. 2 is an explanatory view of the impact drill in a drill mode.
Figure 3:
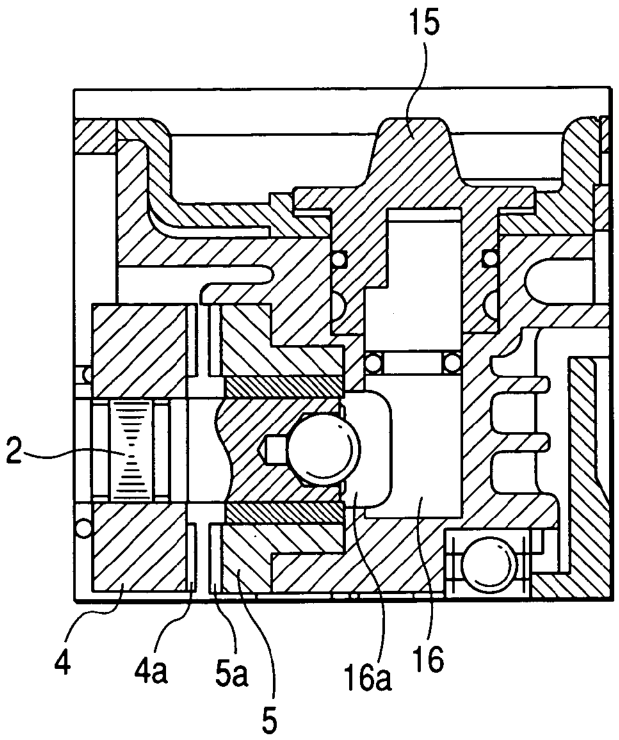
FIG. 3 is an explanatory view of the impact drill in an impact drill mode.
Figure 4:
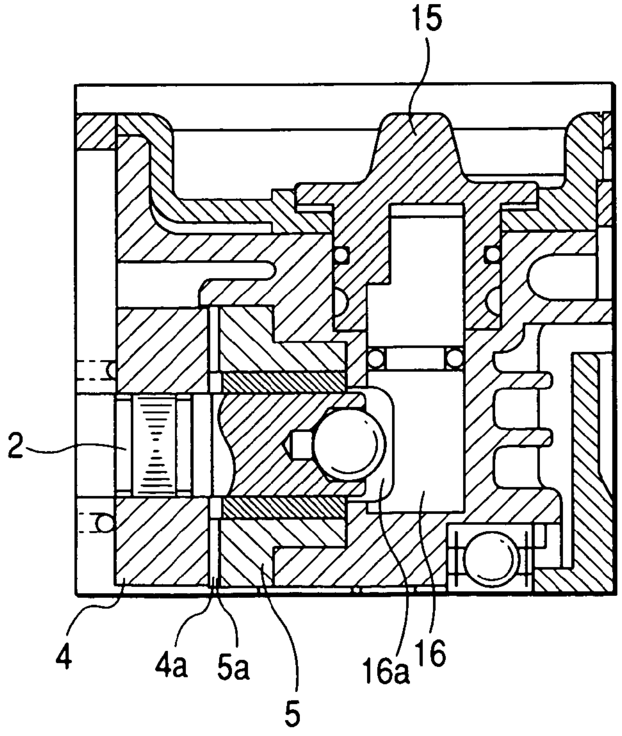
FIG. 4 is an explanatory view of the impact drill in the impact drill mode.
Figure 5:
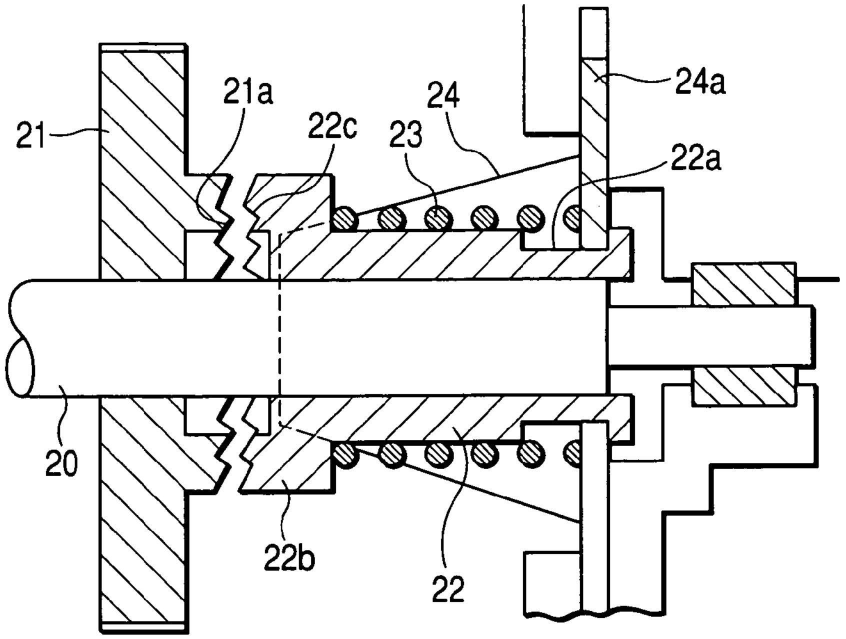
FIG. 5 is a partial constitutional view showing another example of the conventional impact drill.
Figure 6:
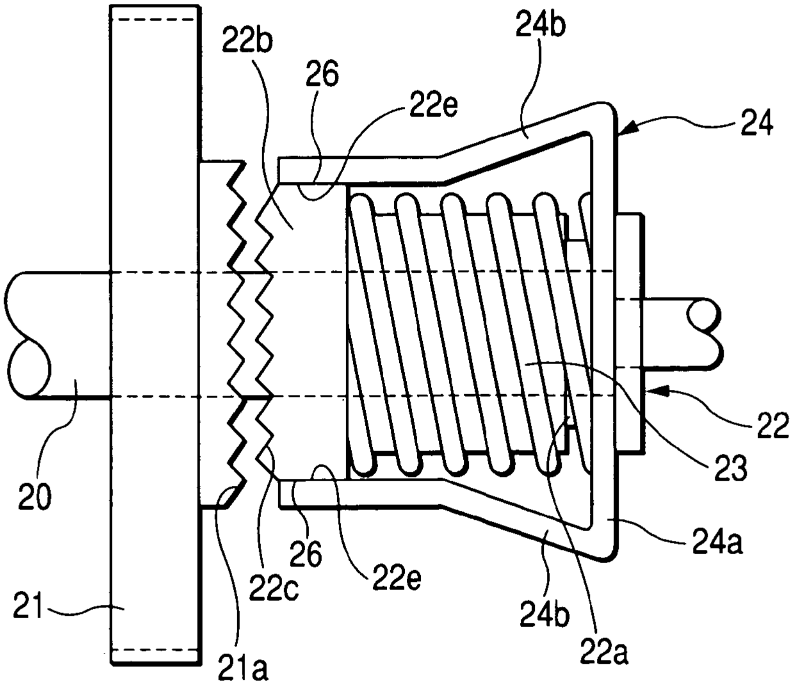
FIG. 6 is a partial constitutional view showing another example of the conventional impact drill.

FIGS. 7A–7G show a situation where the clutch cam 22 and the rotary cam 21 collide when the spindle 20 is rotated at high speed and low speed in FIGS. 5 and 6. Generally, since it is common that the low speed rotation is set at roughly half a number of rotations of the high speed rotation, it is assumed in the following explanation that the rotational motion distance of the rotary cam is 2 h at the high speed rotation and h at the low speed rotation in the time histories FIGS. 7A to 7G as represented in the development views of two dimensional plane as shown in FIGS. 7A–7G.

Figures 7A, 7B, 7C, 7D, 7E, 7F, 7G:
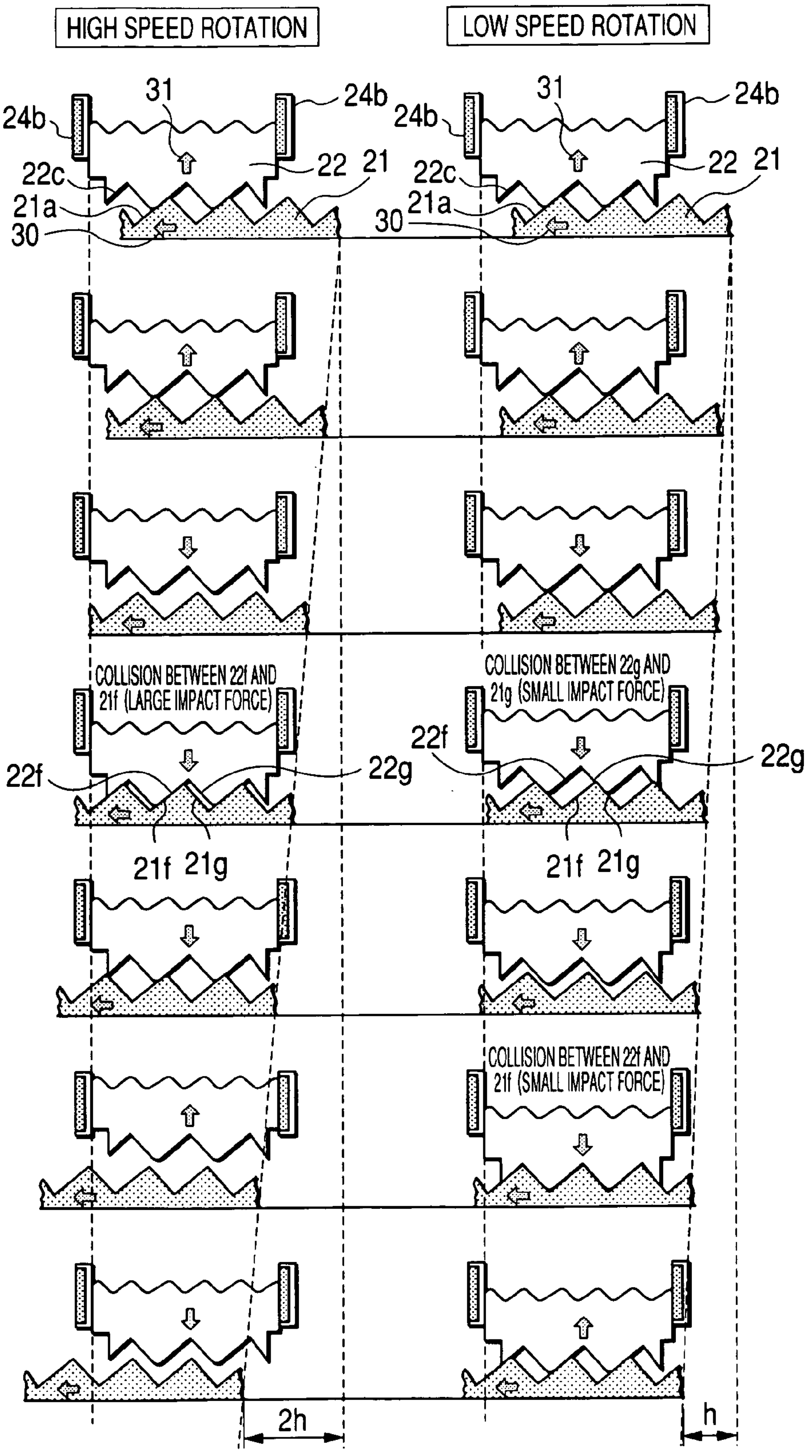
FIGS. 7A–7G are an explanatory view showing how cam collision occurs at high and low speed rotation in another example of the conventional impact drill.

First of all, in the case of high speed rotation, if the rotary cam 21 is rotated (leftward in the figure) in the state as shown in FIG. 7A, the clutch cam 22 opposed to and contact with the rotary cam 21 is moved backward (upward in the figure) due to inclination of serrated irregularities 21*a* to turn in the state of FIG. 7B. The arrow 30 of FIGS. 7A–7G indicates the rotational direction (left and right direction in the figure) of the rotary cam 21 and the arrow 31 indicates the movement direction (vertical direction in the figure) of the clutch cam 22.

At the stage of FIG. 7B, the clutch cam 22 is released and separated from the rotary cam 21, but because the clutch cam 22 is always urged toward the rotary cam 21 by the spring 23 (FIG. 6), the clutch cam 22 begins to move forward (downward in the figure) to the rotary cam 21 in turn, as shown in FIG. 7C. As a result, the clutch cam 22 and the rotary cam 21 collide, as shown in FIG. 7D. Thereafter, as the rotary cam 21 is rotated again, the clutch cam 22 repeatedly moves backward and forward as in FIGS. 7E, 7F and 7G, so that the clutch cam 22 and the rotary cam 21 repeatedly collide on every tooth.

If a front surface 22*f* of the clutch cam 22 and a front surface 21*f* of the rotary cam 21 collide as shown in FIG. 7D, an elastic energy of the spring 23 stored by a backward movement of the clutch cam 22 is transmitted to the rotary cam 22 without loss, causing a great impact force.

Next, a collision situation will be described below where under the conditions that the number of rotations of the rotary cam 21, the weight of the clutch cam 22 and the spring constant of the spring 23 are set up to give rise to the above phenomenon at the time of high speed rotation, the low speed rotation of about half the number of rotations is made.

First of all, if the rotary cam 21 is rotated in the state of FIG. 7A, the clutch cam 22 is moved backward to turn in the state of FIG. 75, and further the clutch cam 22 and the rotary cam 21 are separated away, as shown in FIG. 7C. Thereafter, the clutch cam 22 moves forward to the rotary cam 21 in the same manner as previously described, but because the advancement of the rotary cam 21 is slow, the clutch cam 22 and the rotary cam 21 collide on the back sides 22*g* and 21*g* as shown in FIG. 7D. At this time of collision, almost half an elastic energy of the spring 23 is consumed to cause a small impact force.

Then, at the stage of FIG. 7E, the back sides are contacted, or the back tooth flanks are repeatedly separated and contacted, so that the clutch cam 22 moves forward. Then, at the stage of FIG. 7F, the front side 22*f* of the clutch cam 22 and the front side 21*f* of the rotary cam 21 collide. In the collision at this stage, a residual energy from the elastic energy of the spring 23 which has been consumed at the previous stage FIG. 7D is employed, and the impact force of collision is small due to a loss caused by contact between the back sides. Thereafter, the clutch cam 22 is moved backward again as shown in FIG. 7G.

As described above, if the settings are made such that one great impact force is generated at high speed rotation, two or more small impact forces are generated at low speed rotation, degrading the drilling ability of the drill.

Embodiments of the invention, has been achieved to solve the above-mentioned problems, and will be described below in detail by way of example.

First Embodiment

Figure 8:
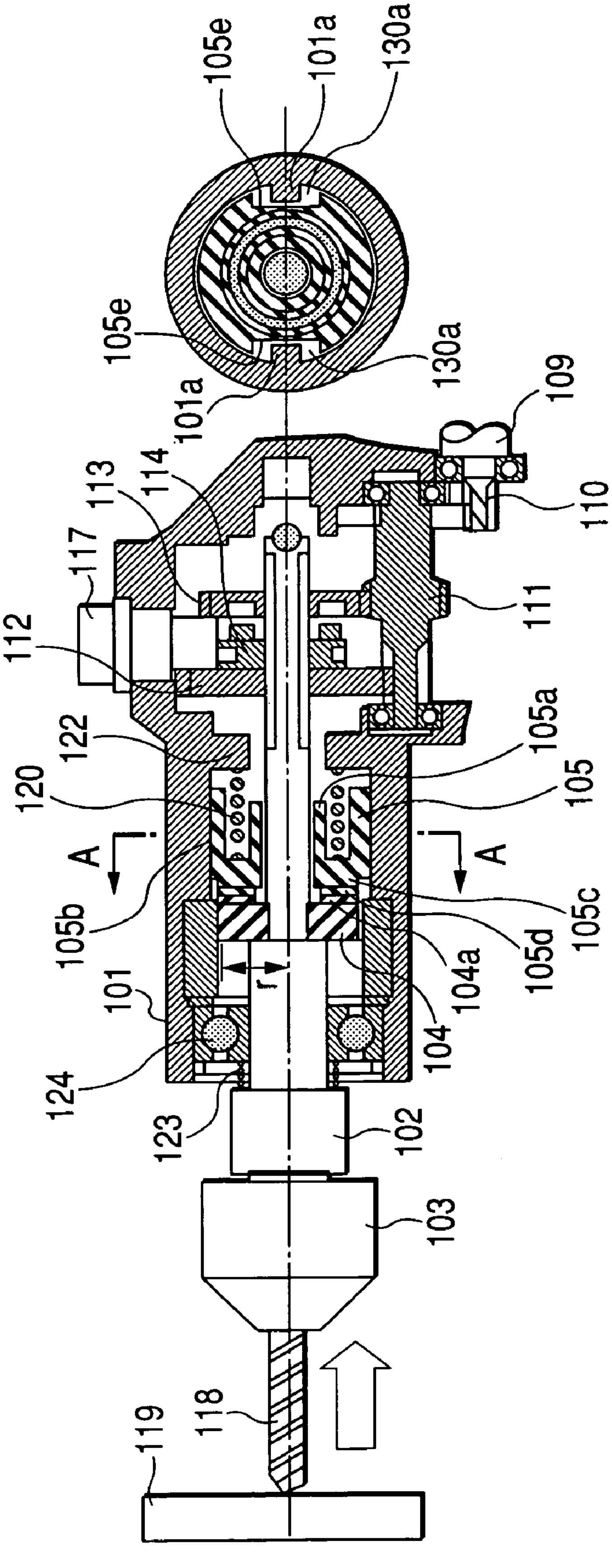
FIG. 8 is a cross-sectional view showing an impact drill according to a first embodiment of the invention.

FIG. 8 is a constitutional view showing the essence of an impact drill according to a first embodiment of the invention.

As shown in FIG. 8, a spindle 102 is provided in a main frame portion 101 and moved forward (to the left in the figure) or backward (to the right in the figure) relative to a workpiece 119. A chuck 103 for mounting a drill bit 118 is provided at the top end of the spindle 102. A first ratchet 104 and a second ratchet 105 are provided in the almost central part of the main frame portion 101. The first ratchet 104 is rotated along with the spindle 102 and roved axially, and has serrated irregularities 104*a* on one face. The second ratchet 105 is formed with serrated irregularities 105*d* on a bottom portion 105*c*. Also, the second ratchet 105 has a dual cylindrical shape, in which an inner cylindrical portion 105*a* slides on the spindle 102 and an outer cylindrical portion 105*b* slides in the axial direction of the spindle 102 along an inner wall of the rain frame portion 101.

The second ratchet 105 has a notch portion 105*e* in a part of the outer cylindrical portion 105*b*, and the main frame portion 101 is provided with a projection 101*a*, whereby the projection 101*a* is inserted into the notch portion 105*e*. As a result, the rotational notion of the second ratchet 105 is blocked. This embodiment has a feature that there is a clearance 130*a* between the notch portion 105*e* and the projection 101*a*, so that the second ratchet 105 can be rotated within a predetermined range.

A side wall portion 122 extends in a direction of the spindle inside the rain frame portion 101, and a spring 120 is provided between the side wall portion 122 and the cylindrical bottom portion 105*c*. Reference numeral 109 denotes a rotation shaft to which a rotational driving force is transmitted from a motor (not shown), in which its rotational driving force is transmitted via a gear 110 to a second pinion 111. Reference numeral 112 denotes a low speed gear, 113 denotes a high speed gear, and 114 denotes a clutch disk, in which when the clutch disk 114 is at the position as shown, a rotational force is transmitted via the low speed gear 112 to the spindle 102.

On the other hand, if the clutch disk 114 is rotated to the position where the high speed gear and the spindle 102 are engaged by rotating a change lever 117, a rotational force of the second pinion 111 is transmitted via the high speed gear 113 to the spindle 102. Accordingly, the spindle 102 can be rotated at low speed or high speed depending on the rotated position of the change lever 117. The experiment of the present inventor has revealed that the vibration transmitted to a hand in the drilling operation is reduced owing to the above constitution.

FIGS. 9A–9G show how the first ratchet 104 and the second ratchet 105 collide when the spindle 102 is rotated at high speed and low speed in the above constitution. The low speed rotation is set at half the number of rotations of the high speed rotation, and the rotational motion distance of the first ratchet 104 is 2 h at high speed rotation and h at low speed rotation in the time histories FIG. 9A to FIG. 9G represented in the development views of two dimensional plane as shown in FIGS. 9A–9G.

Figures 9A, 9B, 9C, 9D, 9E, 9F, 9G:
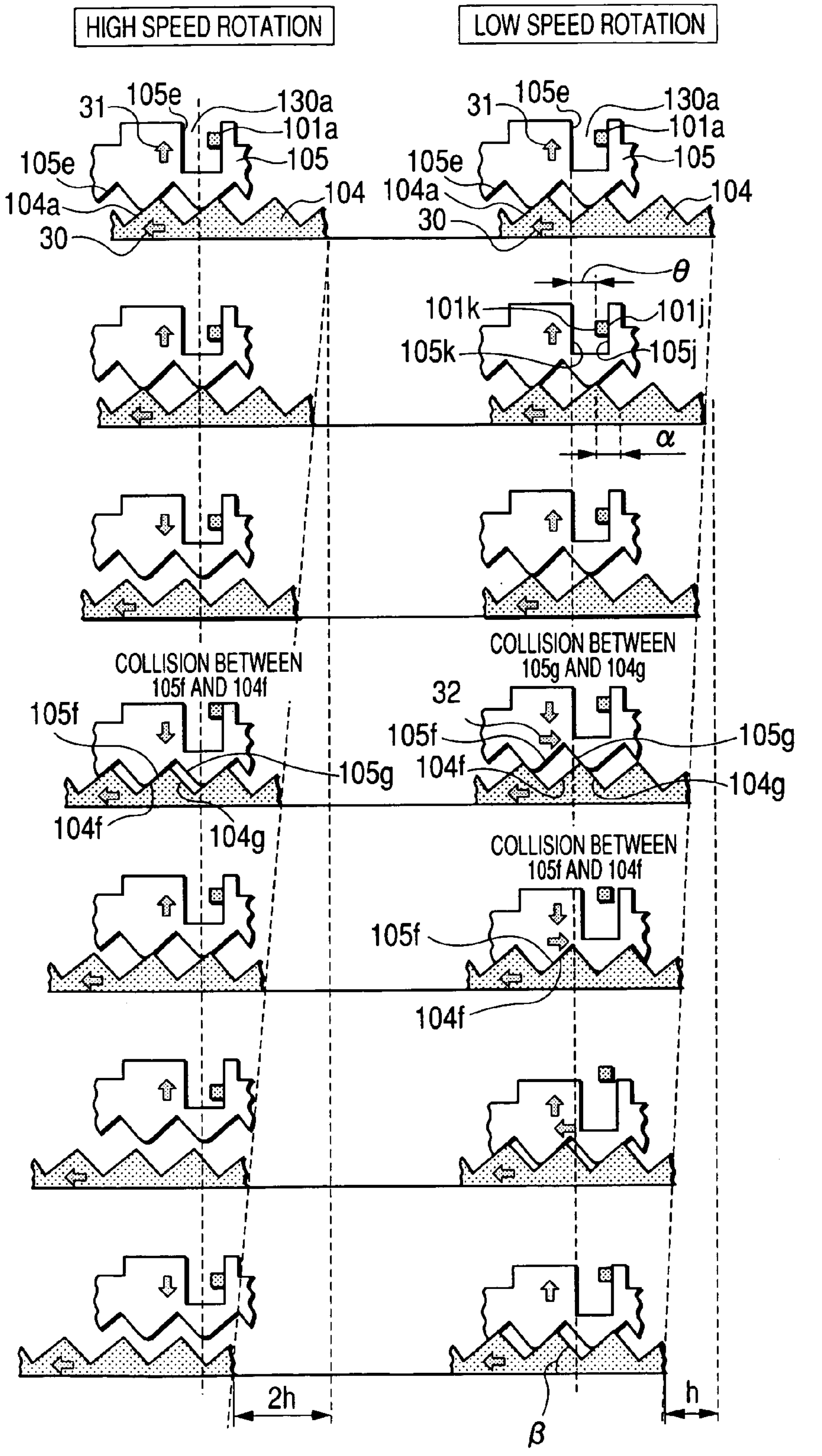
FIGS. 9A–9G are explanatory views showing how cam collision occurs at high and low speed rotations in the impact drill according to the first embodiment of the invention.

First of all, in the case of high speed rotation, if the first ratchet 104 is rotated (leftward in the figure) in the state as shown in FIG. 9A, the second ratchet 105 opposed to and contact with the first ratchet 104 is moved backward (upward in the FIGS. 9A–9G) due to inclination of serrated irregularities 104*a* to turn in the state of FIG. 9B.

As shown in FIG. 9B and FIG. 9C, the second ratchet 105 is released and separated from the first ratchet 104, but because the second ratchet 105 is always urged toward the first ratchet 104 by the spring 120 (FIG. 8), the second ratchet 105 moves forward to the first ratchet 104 from the state of FIG. 9C As a result, the second ratchet 105 and the first ratchet 104 collide, as shown in FIG. 9D. Thereafter, the second ratchet 105 repeatedly moves backward and forward as in FIG. 9E, FIG. 9F and FIG. 9G, so that the second ratchet 105 and the first ratchet 104 repeatedly collide.

At the stage of FIG. 9D, the collision faces between the second ratchet 105 and the first ratchet 104 are always the front sides 105*f* and 104*f*, thereby allowing an elastic energy of the spring 120 (FIG. 8) to be transmitted to the first ratchet 104 without loss at every time and causing a great impact force.

A collision situation will be described below where under the conditions that the number of rotations of the first ratchet 104, the weight of the second ratchet 105 and the spring constant of the spring 120 (FIG. 8) are set up to give rise to the phenomenon at the time of high speed rotation, the low speed rotation of about half the number of rotations is made.

At low speed rotation, as the first ratchet 104 is rotated, as shown in FIGS. 9A and 9B, the second ratchet 105 is raised to turn in the state of FIG. 9C. At the stage of FIG. 9C, the second ratchet 105 is separated from the first ratchet 104, but because the advancement of the first ratchet 104 is slow, the second ratchet 105 and the first ratchet 104 collide on the back sides 105*g* and 104*g* as shown in FIG. 9D.

The second ratchet 105 is provided with the notch portion 105*e* as previously described, in which a whirl-stop projection 101*a* extending from the main frame portion 101 engages this notch portion. And there is a clearance 130*a* between the notch portion 105*e* and the projection 101*a*, in which the rotation angle θ of the clearance 130*a* is equivalent to the rotation angle α of the back side 104*g* in the first ratchet 104 as shown in FIG. 9C.

Thus, at the time of FIG. 9D when the back side 105*g* of the second ratchet 105 and the back side 104*g* of the first ratchet 104 collide, the second ratchet 105 is moved to the right in the figure.

An impact force at the time of collision is very small, because the second ratchet 105 gets rid of the first ratchet 104 upon a light collision, with a small loss of elastic energy.

Thereafter, the second ratchet 105 further moves forward in a direction to the first ratchet 104, and moves to the right. Consequently, the second ratchet 105 and the first ratchet 104 collide on the front sides 105*f* and 104*f*, as shown in FIG. 9E. This collision has a great impact force of collision, because there is some loss due to a slight collision at the stage of FIG. 9D, but the elastic energy of the spring 120 (FIG. 8) urging the second ratchet 105 is almost employed.

And the second ratchet 105 is moved to the left due to the rotation of the first ratchet 104 at the stage of FIG. 9F, so that the right side of the notch portion 105*e* is restrained by the left side of the projection 101*a*. Thereafter, the second ratchet 105 restrained by the left side of the projection 101*a* is moved backward again due to the rotation of the first ratchet 104 as in FIG. 9G.

At the low speed rotation of FIGS. 9A–9G, if a left wall 105*k* of the notch portion 105*e* as shown in FIG. 9B and a left end 101*k* of the projection 101*a* collide, there is a loss in the elastic energy, so that the impact force in the state of FIG. 9E is weakened. Therefore, it is desirable that the rotation angle θ is set up so that the left wall 105*k* of the notch portion 105*e* and the left end 101*k* of the projection 101*a* may not collide. That is, the rotation angle θ is desirably greater than or equal to the amount that the second ratchet 105 is moved to the right from the time when the front sides 105*f* and 104*f* are separated as in FIG. 9C to the time when the front sides 105*f* and 104*f* collide as in FIG. 9E. The amount of movement of the second ratchet 105 to the right is equivalent to the rotation angle α from the vertex of the back side 104*g* in a radial portion of the first ratchet 104 to the lowermost point subtracted by a relative angle rate between the first ratchet 104 and the second ratchet 105. However, the relative angle rate between the first ratchet 104 and the second ratchet 105 is affected by the mass of the second ratchet 105 and the biasing force of the spring 120, and is generally difficult to obtain.

Accordingly, supposing that the relative angle rate between the first ratchet 104 and the second ratchet 105 is zero at minimum, the rotation angle θ is set such that $\theta \geqq \alpha$. That is, the second ratchet is set such that when the first ratchet is in a stopped state, it is supported to be rotatable by an angle or more from the position at which the irregular face of the second ratchet overrides the irregular face of the first ratchet to the position at which the irregular face of the second ratchet engages the irregular face of the first ratchet most deeply. In this way, when the rotation angle rate A of the first ratchet 104 is considerably slow, the left side 105*k* of the notch portion 105*e* is not restrained by the left side 101*k* of the projection 101*a*, so that the second ratchet 105 can move forward.

Also, the rotation angle may be set such that $\theta \geqq 0.6\alpha$. That is, the second ratchet may be set such that when the first ratchet is in the stopped state, it is supported to be rotatable by 0.6 times an angle or more from the position at which the irregular face of the second ratchet overrides the irregular face of the first ratchet to the position at which the irregular face of the second ratchet engages the irregular face of the first ratchet most deeply. In this way, at the considerably slow rate, the left side 105*k* of the notch portion 105*e* and the left side 101*k* of the projection 101*a* collide, but the loss of elastic energy can be reduced.

Also, the rotation angle may be set such that $\theta \geqq 0.3\alpha$. That is, the second ratchet may be set such that when the first ratchet is in the stopped state, it is supported to be rotatable by 0.3 times an angle or more from the position at which the irregular face of the second ratchet overrides the irregular face of the first ratchet to the position at which the irregular face of the second ratchet engages the irregular face of the first ratchet most deeply. In this way, at the slightly slow rate, the left side 105*k* of the notch portion 105*e* and the left side 101*k* of the projection 101*a* collide, but the loss of elastic energy can be reduced.

With first embodiment of the invention, a great impact force is obtained at the high and low speed rotation, whereby the impact drill having the excellent drilling ability is provided.

Second Embodiment

Figure 10:
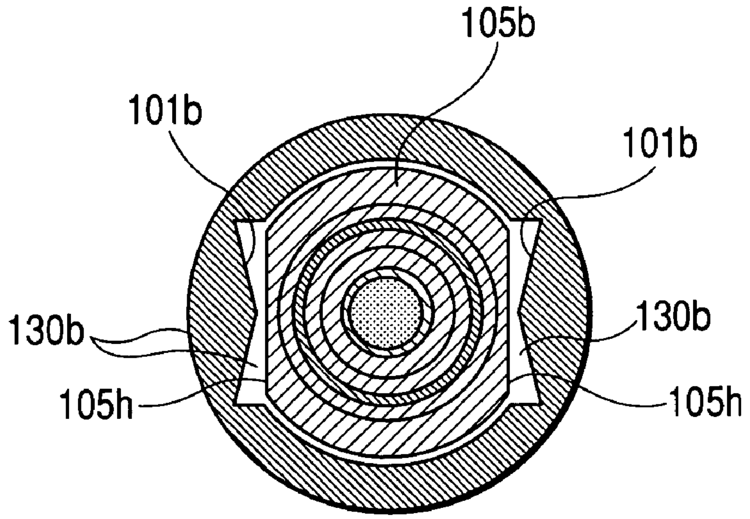
FIG. 10 is a partial constitutional view showing an impact drill according to a second embodiment of the invention.

FIG. 10 shows a second embodiment of the invention, in which a width across flat 105*h* is provided in a part on the outer cylindrical portion 105*b* of the second ratchet 105, the whirl-stop notch portion 101*b* is provided in the main frame portion 101, and a clearance 103*b* is provided between the width across flat 105*h* and the whirl-stop notch portion 101*b*. As a result, the second ratchet 105 can be rotated within a predetermined range, and operated in the same manner as in the first embodiment.

Third Embodiment

Figure 11:
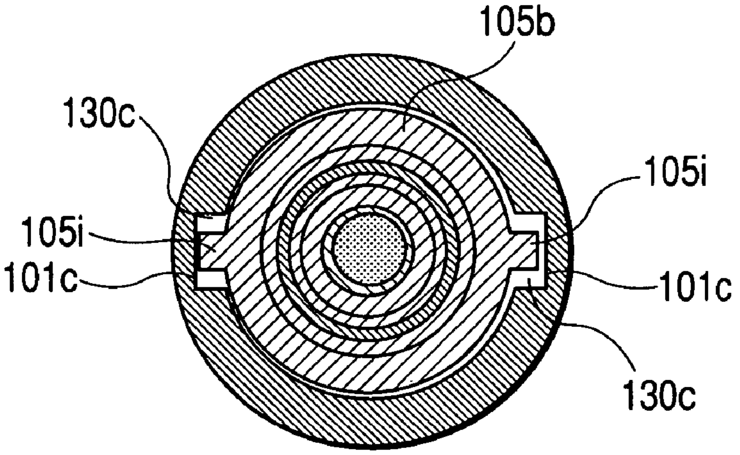
FIG. 11 is a partial constitutional view showing an impact drill according to a third embodiment of the invention.

FIG. 11 shows a third embodiment of the invention, in which a projection 105*i* is provided in a part on the outer cylindrical portion 105*b* of the second ratchet 105, a whirl-stop groove 101*c* is provided in the main frame portion 101, and a clearance 130*c* is provided between the projection 105*i* and the whirl-stop groove 101*c*. With this constitution, the second ratchet 105 can be rotated within a predetermined range, whereby there is the same effect as in the first embodiment.

Fourth Embodiment

Figure 12:
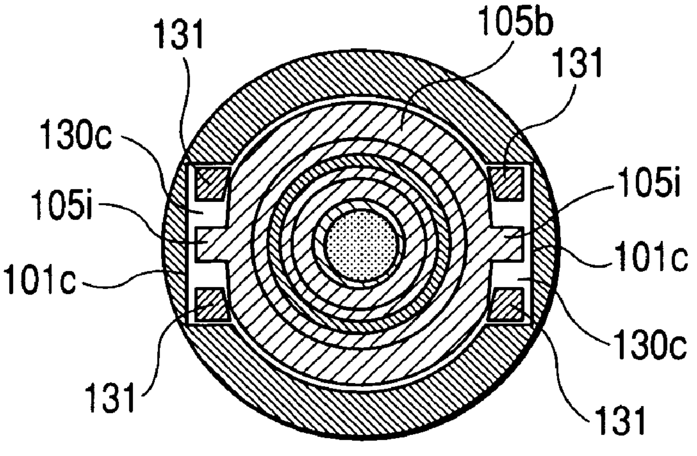
FIG. 12 is a partial constitutional view showing an impact drill according to a fourth embodiment of the invention.

FIG. 12 shows a fourth embodiment of the invention, in which the projection 105*i* is provided in a part on the outer cylindrical portion 105*b* of the second ratchet 105, the whirl-stop groove 101*c* is provided in the main frame portion 101, an elastic body 131 is disposed between the projection 105*i* and the whirl-stop groove 101*c*, and the clearance 130*c* is provided between the projection 105*i* and the whirl-stop groove 101*c*. With this constitution, the second ratchet 105 can be rotated within a predetermined range, and the elastic body 131 relieves the impact at the time of rotation, so that the vibration on the groove 101*c* is reduced.

Fifth Embodiment

Figure 13:
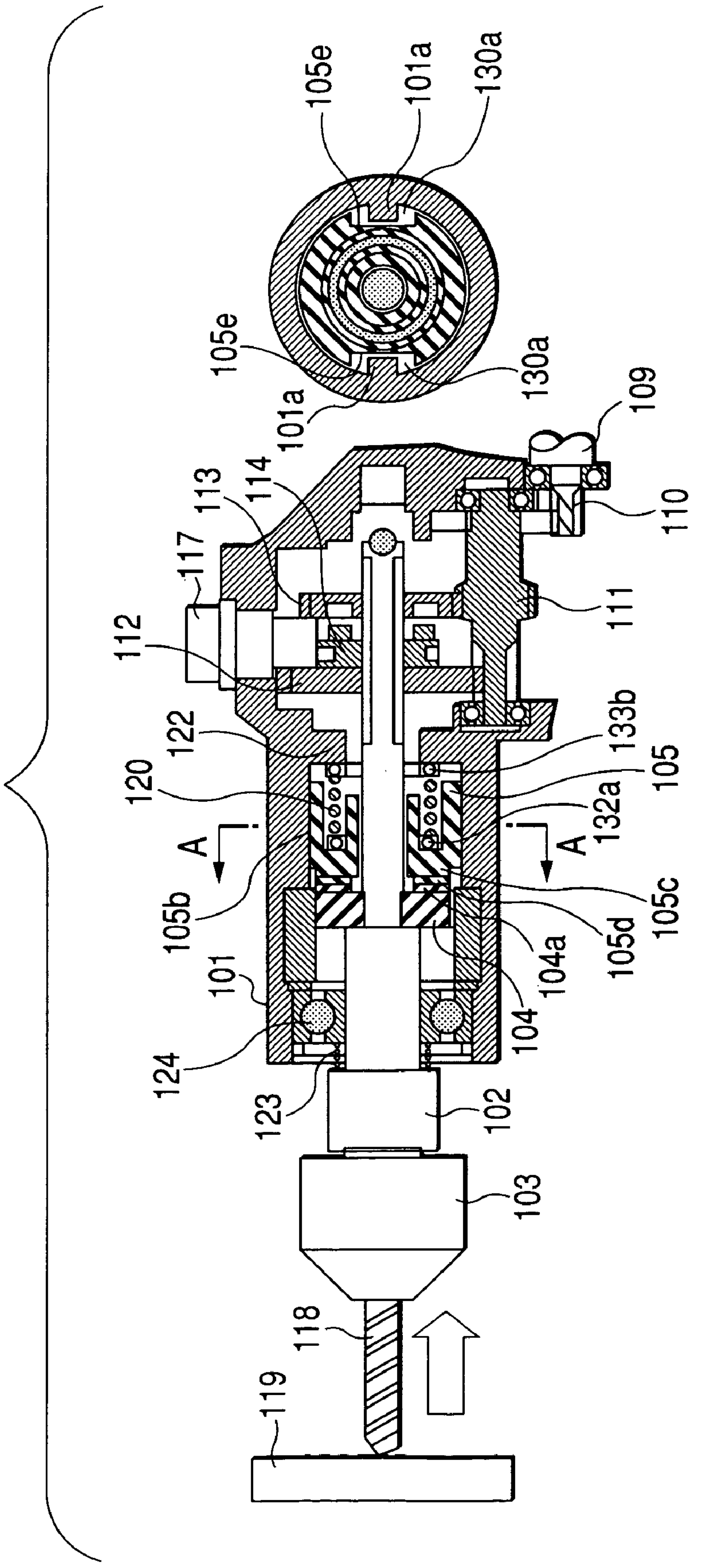
FIG. 13 is a partial constitutional view showing an impact drill according to a fifth embodiment of the invention.

FIG. 13 shows a fifth embodiment of the invention, in which a thrust bearing 132*a* is provided between a cylindrical bottom portion 105*c*of the second ratchet 105 and the spring 120. Also, a thrust bearing 133*b* is provided between the spring 120 and a side wall portion 122 extending from the main frame portion 101.

With this constitution, even if the second ratchet 105 is rotated, a rolling friction with the spring 120 is reduced by the thrust bearing 132*a*. Also, if the second ratchet 105 is rotated in a state except for the thrust bearing 133*b*, the spring 120 is rotated together with the second ratchet 105, but a rolling friction with the side wall portion 122 is reduced owing to existence of the thrust bearing 133.

One or both of the thrust bearings 132*a* and 133*b* may be employed. Also, the thrust bearing 132*a*, 133*b* can be employed only with a ball. With this constitution, the rotation of the second ratchet 105 can be made smoother.

What is claimed is:

1. An impact drill comprising:

a spindle rotated by a motor and movable in an axial direction;

a drill chuck fixed to the spindle and mountable with a drill bit;

a first ratchet fixed to the spindle and having a face including an irregular portion;

a second ratchet having a face including an irregular portion opposed to the face of the irregular portion of the first ratchet and movable in the axial direction, and a spring for urging the second ratchet in a direction of the first ratchet, in which the spindle is given an axial vibration by a contact and separation action between the irregular faces of the first and second ratchets due to a relative rotation of the first ratchet to the second ratchet, wherein the second ratchet is supported to be rotatable within a predetermined range defined by a small rotational angle.

2. The impact drill according to claim 1, wherein the second ratchet is supported to be rotatable by at least an angle from a first position at which the irregular face of the second ratchet overrides the irregular face of the first ratchet to a second position at which the irregular face of the second ratchet engages the irregular face of the first ratchet most deeply, when the first ratchet is in a stopped state.

3. The impact drill according to claim 1, wherein the second ratchet is supported to be rotatable by at least 0.6 times an angle from a first position at which the irregular face of the second ratchet overrides the irregular face of the first ratchet to a second position at which the irregular face of the second ratchet engages the irregular face of the first ratchet most deeply, when the first ratchet is in a stopped state.

4. The impact drill according to claim 1, wherein the second ratchet is supported to be rotatable by at least 0.3 times an angle from a first position at which the irregular face of the second ratchet overrides the irregular face of the first ratchet to a second position at which the irregular face of the second ratchet engages the irregular face of the first ratchet most deeply, when the first ratchet is in a stopped state.

5. The impact drill according to claim 1, wherein a notch portion is provided on an outer circumference of the second ratchet, a projection portion provided in a main frame portion of the impact drill is inserted into the notch portion, and a predetermined clearance is provided between the notch portion and the projection portion.

6. The impact drill according to claim 5, wherein an elastic body is disposed in the predetermined clearance.

7. The impact drill according to claim 5, wherein a thrust bearing is provided between the second ratchet and the spring.

8. The impact drill according to claim 7, wherein the thrust bearing is provided between the spring and a side wall portion extending from the main frame portion.

9. The impact drill according to claim 5, wherein a thrust bearing is provided between the spring and a side wall portion extending from the main frame portion.

10. The impact drill according to claim 1, wherein a width across flat of two parallel faces is provided in a part on a cylindrical portion of the second ratchet, a notch portion opposed to the width across flat is provided on a main frame portion of the impact drill, and a predetermined clearance is provided between the width across flat and the notch portion.

11. The impact drill according to claim 1, wherein a projection portion is provided on an outer circumference of the second ratchet, the projection portion is inserted into a notch portion provided in a main frame portion of the impact drill, and a predetermined clearance is provided between the projection portion and the notch portion.

* * * * *